UNITED STATES PATENT OFFICE.

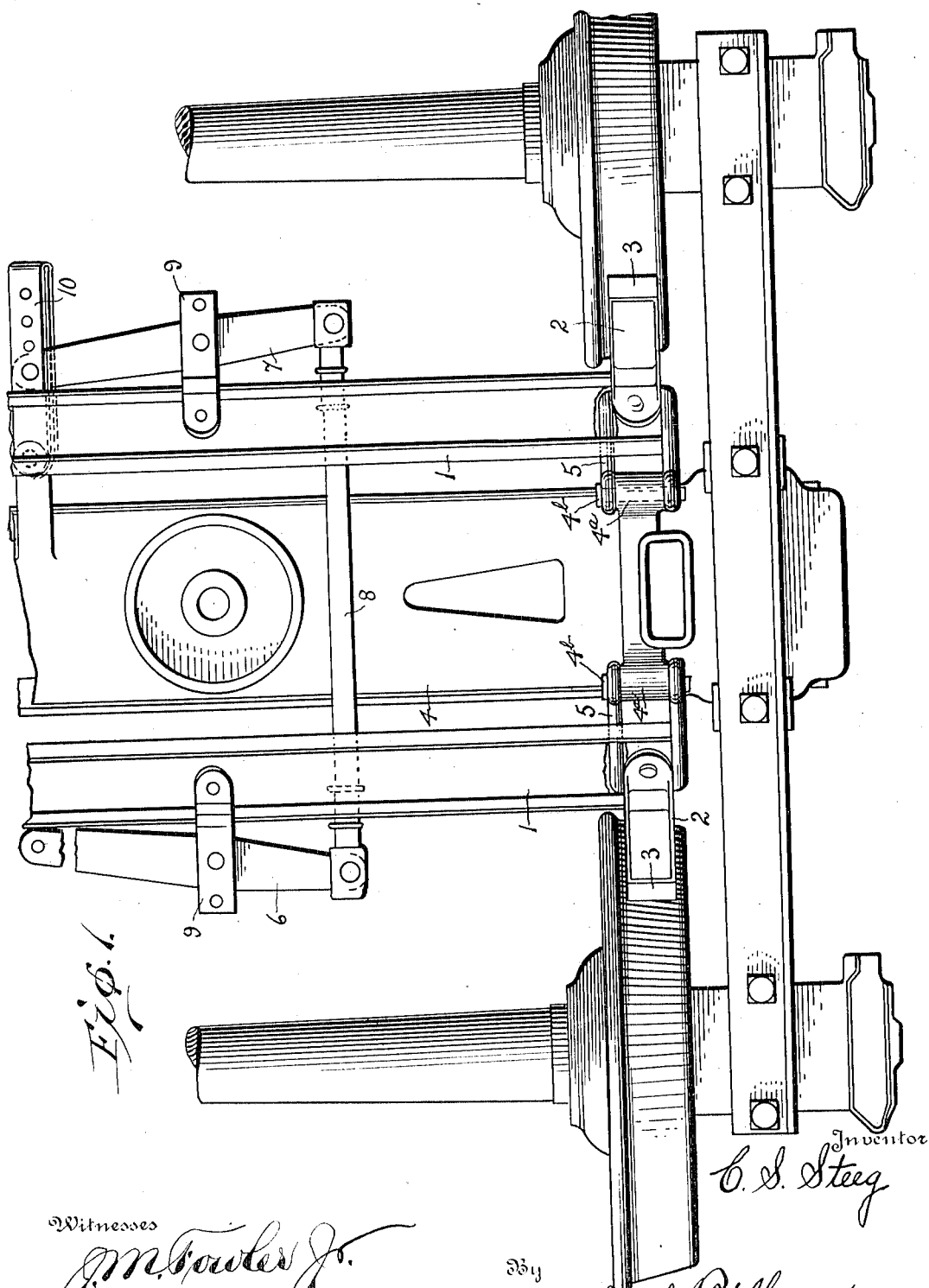

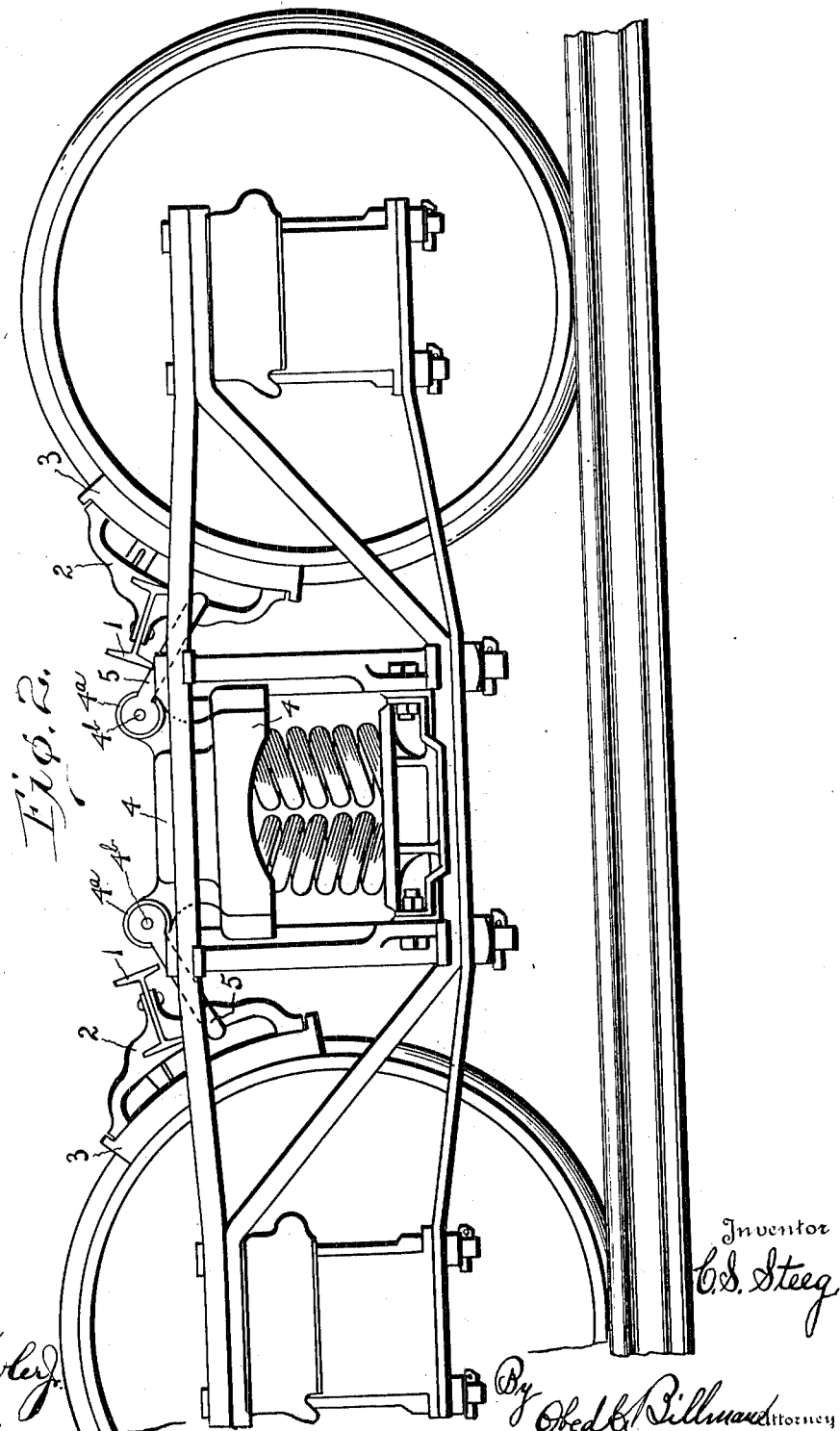

CHARLES S. STEEG, OF WINSLOW, ARIZONA.

CAR-BRAKE MECHANISM.

1,102,175.

Specification of Letters Patent. Patented June 30, 1914.

Application filed December 6, 1913. Serial No. 805,024.

*To all whom it may concern:*

Be it known that I, CHARLES S. STEEG, a citizen of the United States, residing at Winslow, in the county of Navajo and State of Arizona, have invented certain new and useful Improvements in Car-Brake Mechanism, of which the following is a specification.

My invention relates to improvements in car brake mechanism, the primary object being to provide a generally improved brake rigging of exceedingly simple, cheap, and efficient construction, particularly adapted to be used in connection with car trucks and air brake mechanism of standard equipment, or of any suitable or prevailing form or type.

A further object is the provision of a "load and empty brake" which is regulated by the action of the truck springs in accordance with the superposed load, and in carrying out this object the brake hangers are attached to a common vertically movable member such as the truck bolster of a standard truck (as shown in the present instance), or if a standard pressed steel truck is employed the brake hangers may be attached to the car bolster, the brake hangers being preferably disposed downwardly and outwardly, or normally extending toward the truck wheel axles, with the brake beams, heads, and shoes disposed at the upper inner quarter portions of the truck wheels so that the brake shoes have a bearing down contact with the upper inner portions of the wheel treads, it being obvious by reason of the above construction, that when the car is empty and the truck springs are relaxed, the brake shoes will rest on the wheel treads at a greater and different angle and that in accordance with the superposed load the springs will be compressed thereby correspondingly moving the brake shoes toward the horizontal planes of the wheel axles and causing the piston travel of the air brake mechanism to be correspondingly shortened thereby causing the car to brake according to the lading.

A still further object is to improve the general construction, arrangement, and relative disposition of the parts, whereby to reduce to a minimum any tendency of the brake beams or levers to become broken or to fall upon the track as well as to provide means whereby the parts may be readily inspected or repaired.

A still further object is to provide a more efficient braking contact with the wheel treads and to reduce to a minimum any tendency of the wheels to slide or skid, the present construction having a tendency to crowd the wheels toward the rails.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1, is a top plan view of one side of a standard car truck equipped with the improved car brake mechanism. Fig. 2, a side elevation of the same showing the parts in their applied or operative position the truck bolster being shown in a slightly depressed or partially loaded position.

Similar numerals of reference designate like parts throughout all the figures of the drawings.

The improved brake mechanism comprises a pair of brake beams 1, provided at their ends with brake heads or blocks 2, the latter being provided with brake shoes, 3.

As a means for causing the car to brake according to the lading or superposed load, or in other words, to decrease or shorten the air brake piston travel and connections in accordance with the compression of the truck springs, the brake beams and heads 1, and 2, respectively, are connected to or hung from a common vertically movable member, which in the present instance, comprises the truck bolster 4, through the medium of hanger links 5, said hangers, in the present instance, being of substantially U-shape and being pivotally connected, in the present instance, to the brake heads or blocks 2, and connected at their inner or opposite ends to bearing lugs 4ª, of the truck bolster by means of bearing pins 4ᵇ.

The brake beams 1, are adapted to be operated by and connected to the air brake mechanism through the medium of brake levers 6, and 7, connected to each other by means of a brake lever coupling bar 8, said levers 6, and 7, being pivotally connected to the brake beams, 1, by means of bearing brackets 9, the dead lever 7, being connected at one end to a lever guide 10, connected to and carried by the truck bolster 4, and the live brake lever 6, being connected to the air brake mechanism in any suitable and convenient manner.

From the foregoing description, taken in connection with the accompanying drawings, the operation and advantages of my invention will be readily understood.

Having thus described one of the embodiments of my invention, what I claim and desire to secure by Letters Patent, is,—

1. In a car brake, in combination a truck frame and wheels, a vertically movable member, brake beam hangers connected to the latter and normally extending toward the axial centers of said wheels, brake beams and heads carried by said hangers, and brake operating pistons and lever mechanism connected to said brake beams whereby the travel of said pistons is decreased and the pressure of said brake heads increased in accordance with the depression of said vertically movable member.

2. A car brake, a truck frame and truck wheels therefor, a pair of brake beams and heads arranged in proximity to the upper inner quarter portions of said wheels, hanger links connected therewith, and a common vertically movable member connected to the inner ends of said links, the inner pivoted connections of said links being normally disposed above their outer pivoted connections with said brake beams and heads.

3. In a car brake, the combination with a truck frame and wheels, and a vertically movable bolster member carried by said truck frame; of brake beam and hanger members connected to and disposed on opposite sides of said vertically movable member, said brake beam members being disposed between the upper inner quarter portions of said wheels and said hanger members having their inner pivoted connections normally disposed above the horizontal plane of their outer pivoted portions, and brake operating mechanism operatively connected to said brake beams.

In testimony whereof I have affixed my signature in presence of two witnesses.

CHARLES S. STEEG.

Witnesses:
J. E. ROHE,
IDA DRUMM.